United States Patent [19]
Jiang et al.

[11] Patent Number: 6,081,589
[45] Date of Patent: Jun. 27, 2000

[54] METHOD AND APPARATUS FOR IDENTIFYING AND HANDLING ON-LINE ACCESS CALLS WITHIN A SWITCH

[75] Inventors: Shou-Huey Jiang, Durham; Geoffrey William Fair, Cary; Steven Robert Medeiros, Raleigh, all of N.C.

[73] Assignee: Nortel Networks Corporation, Montreal, Canada

[21] Appl. No.: 08/980,534

[22] Filed: Dec. 1, 1997

[51] Int. Cl.[7] .................................................. H04M 3/42
[52] U.S. Cl. .......................... 379/207; 379/219; 379/220; 379/221; 379/229; 379/230
[58] Field of Search .................... 370/351, 229, 370/230, 231, 232, 233, 234, 235, 236, 237, 238; 379/207, 219, 220, 221, 229, 230, 242

[56] References Cited

U.S. PATENT DOCUMENTS

| | | | |
|---|---|---|---|
| 4,748,658 | 5/1988 | Gopal et al. | 379/221 |
| 5,423,003 | 6/1995 | Berteau | 395/200 |
| 5,485,455 | 1/1996 | Dobbins et al. | 370/255 |
| 5,602,991 | 2/1997 | Berteau | 395/200.01 |
| 5,610,910 | 3/1997 | Focsaneanu et al. | 370/351 |
| 5,680,390 | 10/1997 | Robrock, II | 370/229 |
| 5,727,160 | 3/1998 | Ganesan et al. | 395/200.79 |
| 5,742,905 | 4/1998 | Pepe et al. | 455/461 |
| 5,905,873 | 5/1999 | Hartmann et al. | 395/200.79 |

OTHER PUBLICATIONS

Bellcore White Paper, Architectural Solutions to Internet Congestion based on SS7 and Intelligent Network Capabilities, Publication No. OOA–1019W, Oct. 30, 1997 by Dr. Amir Atai and Dr. James Gordon.

*Primary Examiner*—Scott Wolinsky
*Assistant Examiner*—Bing Bui

[57] ABSTRACT

Method and apparatus for identifying on-line access calls in a network switch. The switch determines which calls are to an on-line service provider, usually an Internet service provider or ISP. The switch then determines if the service provider has enough ports available to handle the call, and if the connection to a dedicated data network has enough capacity. The call can then be handled as an on-line access call and routed accordingly. The initial determination as to whether the call is an on-line access call can be made by analyzing information received when the call is initiated such as the called party number digits or by a query initiated by an advanced intelligent network (AIN) trigger.

26 Claims, 6 Drawing Sheets

METHOD AND APPARATUS FOR IDENTIFYING AND HANDLING ON-LINE ACCESS CALLS WITHIN A SWITCH

CROSS-REFERENCE TO RELATED APPLICATION

This application is related to copending application Ser. No. 08/982,155, filed on the same date as the present application, entitled "Method and Apparatus for Alleviating Switch Congestion Caused by Long Hold Times for On-Line Access Calls," which is assigned to the assignee of the present application.

BACKGROUND

1. Field of the Invention

This invention pertains to identifying on-line access calls so that they can be tagged for special handling. In the preferred embodiment, such calls are routed away from a public network switching fabric and onto a dedicated data network such as a frame relay network. In this way, the invention helps to alleviate switch congestion caused by long hold times for on-line access calls such as Internet access calls.

2. Description of the Problem Solved

Currently, all calls made via the public general purpose communications network are handled by the public network fabric in the same manner. In most areas this fabric is an integrated services digital network (ISDN) fabric. The public network today does not distinguish between on-line access calls and other calls. In the case of on-line access calls, the public network switching fabric is used to connect the user to the point of presence (POP) for the on-line provider, usually an Internet service provider (ISP)

The advent of on-line services and especially the Internet has caused switching congestion to occur in the public network fabric due to the long holding times associated with on-lines access calls. This congestion can prevent the completion of regular speech and data calls due to the non-availability of switching resources over prolonged periods.

What is needed is a way to identify on-line access calls so they can be tagged for special handling. Such calls can be diverted away from the public network switching fabric at the originating switch. The calls can then be routed through a dedicated data network that is also connected to the POP for the service provider.

SUMMARY

The present invention fills the above need by providing methods of identifying which calls are intended for an on-line service provider. In the preferred embodiment, the invention also determines whether they can be off-loaded to a dedicated data network which is associated with the public switched network. Once these two determinations are made, most calls are routed through this dedicated data network, thereby alleviating switch congestion on the public switched network.

According to one embodiment of the invention, a call is received at an originating switch from customer premises equipment (CPE). Information received from the CPE is analyzed to determine if the number is a service provider number. This information could be an access code, information in a set-up message, bearer capability information, or simply the called party number (CDN). (CDN is used as an acronym for CalleD party Number in many telephone industry standards.) If the called party number is a service provider number, the call can be tagged for special handling. In the preferred embodiment, the switch then checks to see if completing the call via a dedicated data network will cause the number of calls to exceed the port number of the service provider. If the call will not, the switch then checks to see if completing the call will cause the engineering number for the local area network (LAN) that connects the originating switch to the dedicated data network to be exceeded. If the call will not, the numerical tables specifying these numbers are updated and the call is set-up.

In another embodiment of the invention, the originating switch encounters an advanced intelligent network (AIN) trigger which causes a query to be sent to a database. A particular trigger causes the database to direct the switch to consider the call an on-line access call. At this point, the call is tagged for special handling. In the preferred embodiment, the appropriate port number and engineering number checks are made and the call completes as before. The data base can either be a service control point (SCP) in the advanced intelligent network or an adjunct at the originating switch.

The present invention is implemented in a switch which includes at least one adapter for connection to customer premises equipment, at least one adapter for connection to the dedicated data network, a switch matrix and a processing core. The processing core is programmed to control the operation of the switch and execute the method of the invention. Computer program code causing the switch to perform the method is stored in a medium which can be disk or memory within the switch.

An example network in which the present invention is employed includes customer premises equipment (CPE), usually in a small office/home office (SOHO) environment. The CPE is connected to the switch which performs the call identification process. In the preferred embodiment this switch is an integrated services digital network (ISDN) switch. The switch is connected to a dedicated data network switching fabric which is in turn connected to a point-of-presence (POP) for a service provider.

DETAILED DESCRIPTION OF THE PREFERRED EMBODIMENTS

Figure 1:
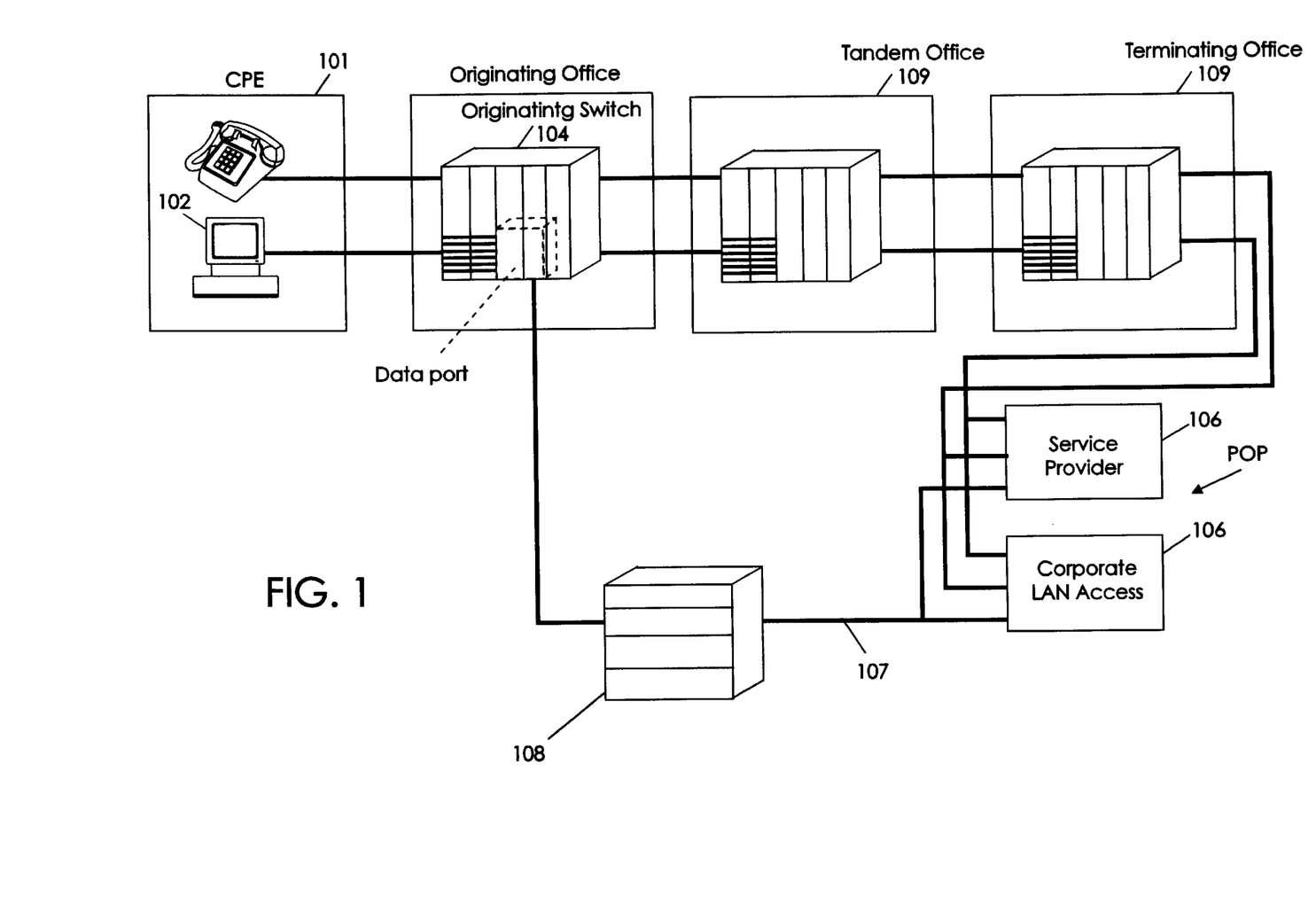
FIG. 1 shows a network environment in which the present invention can be used.

FIG. 1 shows an example network environment of the present invention. In this network, protocol conversion and call identification is performed by the originating switch 104. The customer premises equipment 101 is located in a small office/home office (SOHO) environment which contains users who typically access network services via a workstation 102. The workstation can be connected to the originating switch directly through a conversion device such as a modem or through a local area network (LAN) which is part of the SOHO environment. The originating switch 104 is typically a switch in a public network. In most cases today this network will be an integrated services digital network (ISDN). Although we refer to this network as a "public network" for convenience in the description, this network may be a privately owned wide area network or other type of switched network. Users of this switch 104 are connected to the switch via standard ports which are designed to handle all types of voice and data. In the ISDN case these are basic rate interface (BRI) ports. The switch also has a data port which is connected to the dedicated data network 107, which in turn is connected to the service provider point of presence (POP) 106. The entry point 108 the dedicated data network is usually a device such as a router. Point-of-presence 106 can be either for an on-line service provider such as an Internet service provider or ISP, or for a corporate local area network (LAN) to provide work-at-home access to employees. Public network switching fabric 109 represents the conventional path from the originating switch 104 to the service provider POP 106. Public network switching fabric 109 includes other switches which may be in tandem offices and terminating offices, and the connections between them. These resources can become congested due to the long hold times of on-line access calls. When the present invention is employed, however, switching congestion on the public network switching fabric 109 is alleviated by intercepting on-line access calls and transparently passing them to a high speed dedicated data network 107.

The dedicated data network 107 of FIG. 1 can be a frame relay network, or it can be an asynchronous transfer mode (ATM) network. If the network is a frame relay network, the connection to the entry point of the network 108 between the originating switch and the dedicated data network is normally made via local area network (LAN) such as fast Ethernet. However, if the dedicated data network 107 is an ATM network, the connection to the entry point 108 is an ATM connection and the data port in the switch can also be implemented by an ATM adapter. In either case, the switch 104 performs at least some of the protocol conversion necessary to transfer calls to the dedicated data network. In the preferred embodiment, the switch performs all protocol conversion.

Figure 2:
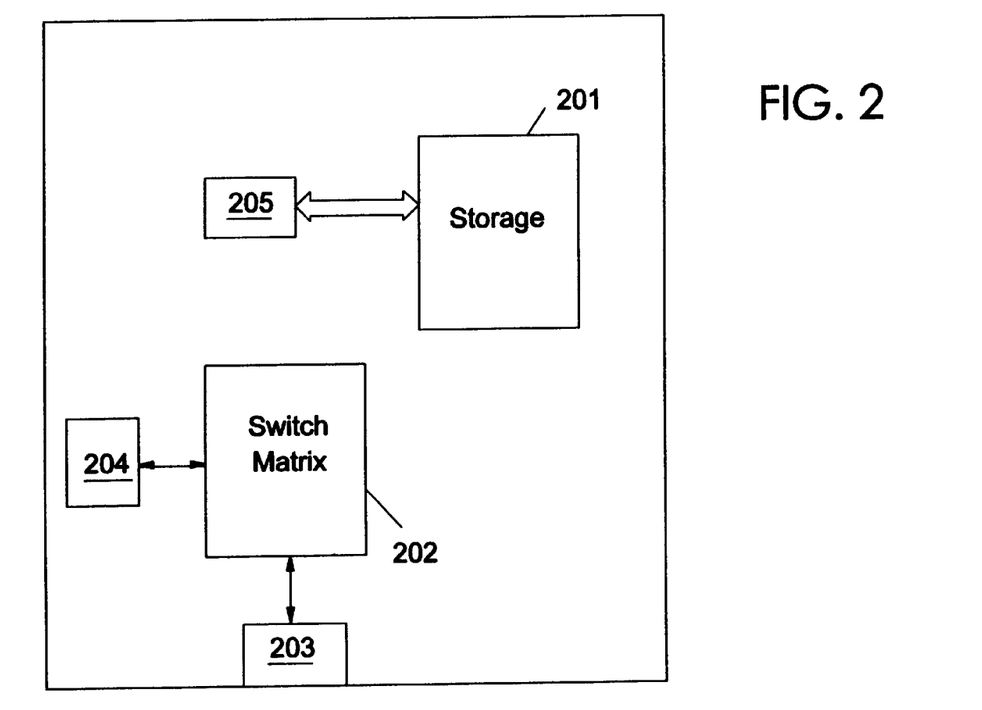
FIG. 2 shows a functional block diagram of a public network switch which implements the present invention.

FIG. 2 is a functional block diagram of a public network switch which implements the invention. In the preferred embodiment the switch is an ISDN switch. The switch includes a switch matrix 202. The switch matrix 202 is controlled by a processor 205 in conjunction with appropriate computer program code held within storage 201. The storage is one of or some combination of random access memory, read only memory, and/or storage media. The processor, memory and appropriate computer program code together form the processing core for controlling the operation of the switch, including determining which calls are on-line access calls according to this invention, establishing communication with the dedicated data network, and protocol conversion. The switch matrix 202 is connected to a mixed port adapter 204, which in the preferred embodiment is an ISDN basic rate interface adapter. The switch matrix 202 is also connected to data port adapter 203. In the preferred embodiments, the data port adapter is a local area network (LAN) adapter or an asynchronous transfer mode (ATM) adapter.

Figure 3:
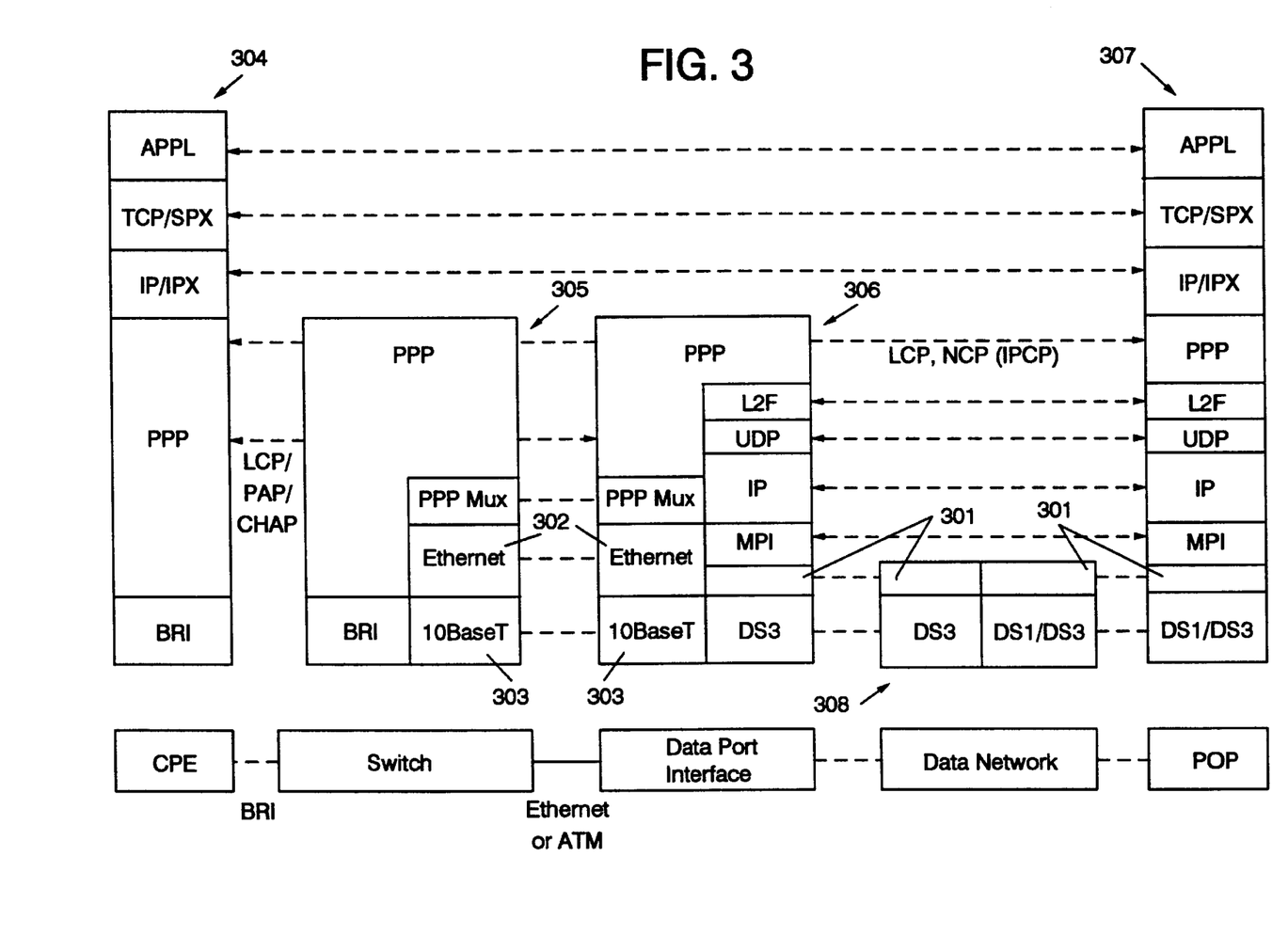
FIG. 3 shows one example of the protocol stacks which can be used with the present invention.

FIGS. 3 shows one example of the detailed protocol stacks which are used with the invention. Layers 302 and 303 are shown as Ethernet protocol layers. These are ATM layers in the case where an ATM adapter provides for connection of the switch to the dedicated data network. Layers 301 are frame relay protocol layers where a frame relay network is the dedicated data network and ATM protocol layers where the dedicated data network is an ATM network. Immediately above layers 301 is the multi-protocol interconnect (MPI) layer. In the case where ATM is used, the protocol is multi-protocol interconnect over ATM. Where frame relay is used it is multi-protocol interconnect over frame relay. DS1 refers to digital signaling 1 and DS3 refers to digital signaling 3. DS1 can transmit twenty-four 64 kbps channels and has a capacity of 1.544 Mbps. DS3 refers to digital signaling 3. DS3 has a capacity of 672 channels or 44.7 Mbps. DS1 and DS3 correspond to the physical layer, known as layer 1 of the well known open systems interconnect (OSI) model.

IP corresponds to the Internet protocol, which is part of TCP/IP and provides the basis for best-effort, connectionless datagram delivery services to transport messages between machines. UDP represents the user datagram protocol which is used with the IP protocol. PPP is the well-known point-to-point protocol. PPP mux represents multiplexed PPP. IPX is the Internet packet exchange. IPX provides connectionless datagram delivery services in situations in cases where guaranteed delivery services are not required or where an occasional lost packet is not critical. SPX refers to sequence packet exchange, and provides connection-oriented, reliable, sequence transport delivery and flow control. This protocol ensures that packets are received in order and therefore provides guaranteed packet delivery. TCP refers to transmission control protocol which is part of the well-known TCP/IP. TCP provides reliable, connection-oriented stream delivery services using the underlying IP to transport messages between machines. APPL refers to the application layer. If the POP resides at an Internet service provider or ISP, the application will be an Internet application such as web services or an e-mail application.

Figure 4:
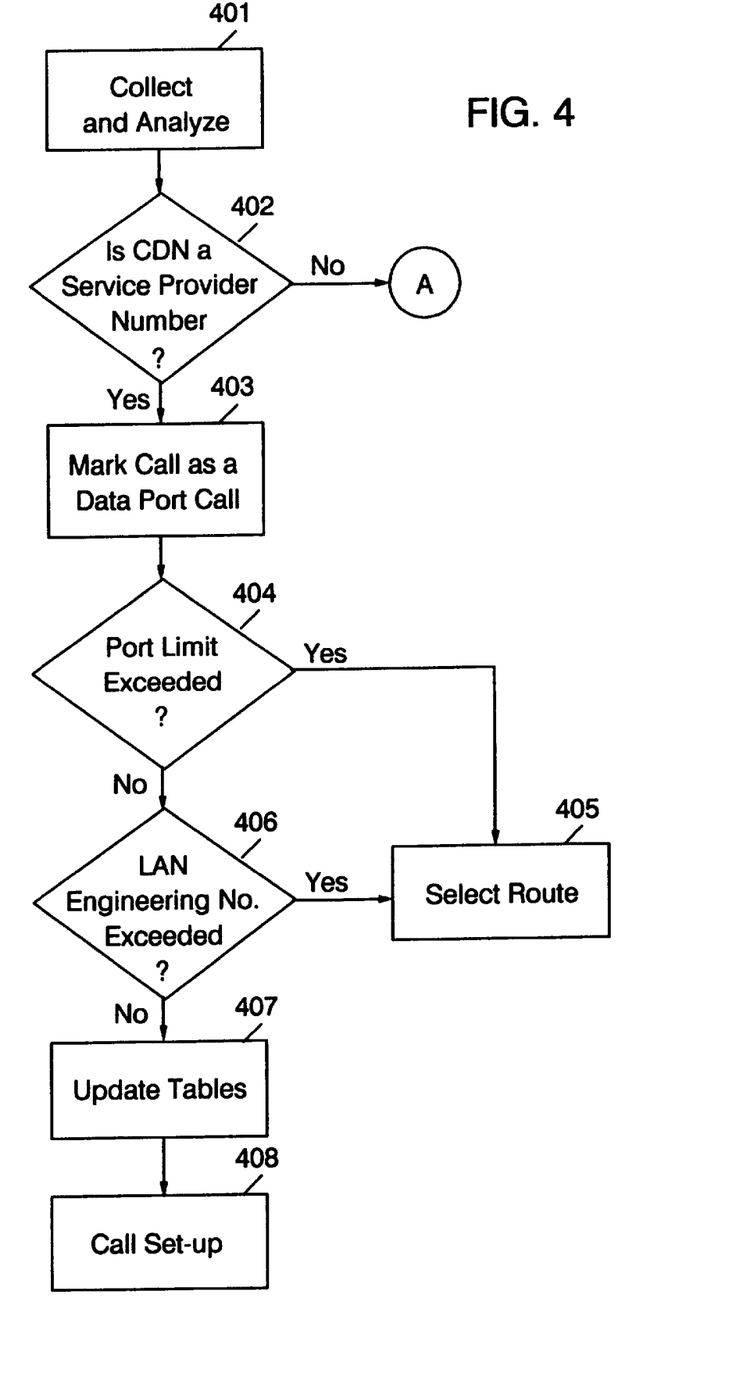
FIG. 4 shows a flow-chart illustrating one method of identifying calls according to the present invention.

FIG. 4 shows the method executed by the switch in one embodiment of the invention. In this embodiment, information from the customer premises equipment (CPE) is analyzed to determine if the number is a service provider number. As previously mentioned, the service provider could be an Internet service provider or the provider of some other commercial on-line service. The number could also be an access number to a corporate dial-up connection such as for corporate local area network (LAN). At 401 the information is collected and analyzed. At 402, the switch determines whether the number is an on-line access number. If the number is not, the switch proceeds to alternate call handling at A. If it is, the switch marks the call as a call which may be handled via the data port to the dedicated data network at 403.

At this point, further determinations must be made to determine of the call can actually be handled via the data port of the switch. First, at 404 the switch checks to see if completing the call would cause the port limit at the service provider to be exceeded. The port limit numbers are provisioned at the switch based on agreement with the service provider. If the limit would be exceeded, the switch then selects another route at 405. In most cases this will be a route through the public switched network. If the port number would not be exceeded, the switch then checks the local area network (LAN) engineering number for the LAN which connects it to the dedicated data network via the data port, at step 406. In the preferred embodiment, this is a fast Ethernet LAN and the engineering number indicates the maximum capacity the LAN is allowed to handle. If this number will be exceeded, the switch selects an alternate route at 405. The engineering number depends on the capacity of the ports used if the connection at the data port is made via shared Ethernet. In this case, capacity could be increased by daisy chaining 2, 4 or 8 peripheral nodes to one Ethernet port depending on how much data traffic is to be routed. In the ideal case, switched Ethernet ports are used since switched Ethernet provides for dedicated access for data port calls. If the LAN engineering number will not be exceeded, the tables within the switch are updated at 407 to take the current call into account. These tables are contained in memory or a storage medium and include information on how many ports are in use at the service provider and the maximum number of ports, as well as information on LAN usage. The call is then set up at 408. The set-up and connection of the on-line access call once it has been identified, is discussed in the related application, which is incorporated herein by reference.

The information analyzed at 401 in FIG. 4 can be of many types. In the simplest case, the called party number (CDN) is simply examined and compared with provisioning tables in the switch to determine if it is a service provider number. Another alternative would be to have users dial an access code, which again, is analyzed and compared with provisioning tables. For example, a user could dial *777 for access to a specific ISP. Still another possibility would be to add another information element to the standard ISDN set-up message which specifies a potential data access call. Finally, a new bearer capability type could be used.

Figure 5:
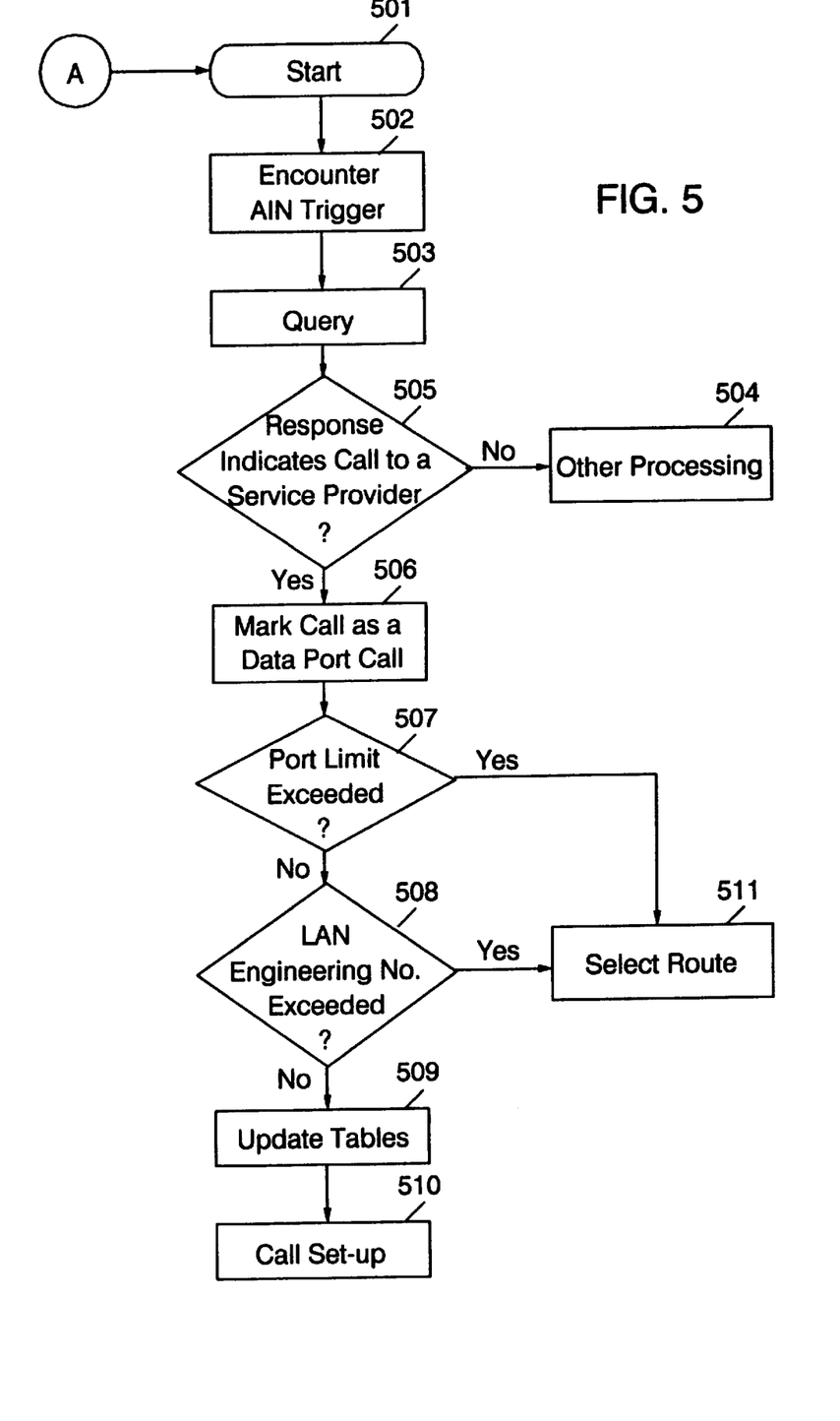
FIG. 5 shows a flow-chart illustrating another method of identifying calls according to the present invention.

FIG. 5 describes the method of the invention according to another embodiment, that in which the determination as to whether to handle a call as an on-line access call is initiated by an advanced intelligent network (AIN) trigger. For this process to be used the originating switch must be a service switching point (SSP). The process starts at 501. Notice that this can be either the only process by which on-line access calls are handled, or it can be an alternate to the process of analyzing the called party number digits in a given switch, picking up at point A from FIG. 4. In either case, an AIN trigger is encountered at 502. When the switch encounters the trigger, the switch suspends call processing and sends a query at 503 to find out how to handle the call. The query can be to a service control point (SCP) database in the AIN, or it can be to an adjunct database residing at the originating switch. In either case, if the response at 505 indicated the call is not to a service provider or corporate dial-up LAN, other processing is done at 504. This is usually the normal default call handling, but may be different depending on whether a different AIN trigger was encountered. If the query response indicated the call is an on-line access call, the call is marked as a data port call at 506.

The rest of the method in FIG. 5 is the same as the last part of the first method shown in FIG. 4. The determination is made at 507 as to whether the service provider port limit would be exceeded by the present call. The LAN engineering number is checked at 508. If either number would be exceeded by the present call, an alternate route is selected at 511. Finally, tables are updated at 509, and the call is set up at 510. It should be noted that although the presently described embodiments of the present invention disclose a tagged call as being routed through the dedicated data network, it is possible to make other uses of the knowledge within the switch that the call is an on-line access call.

Figure 6:
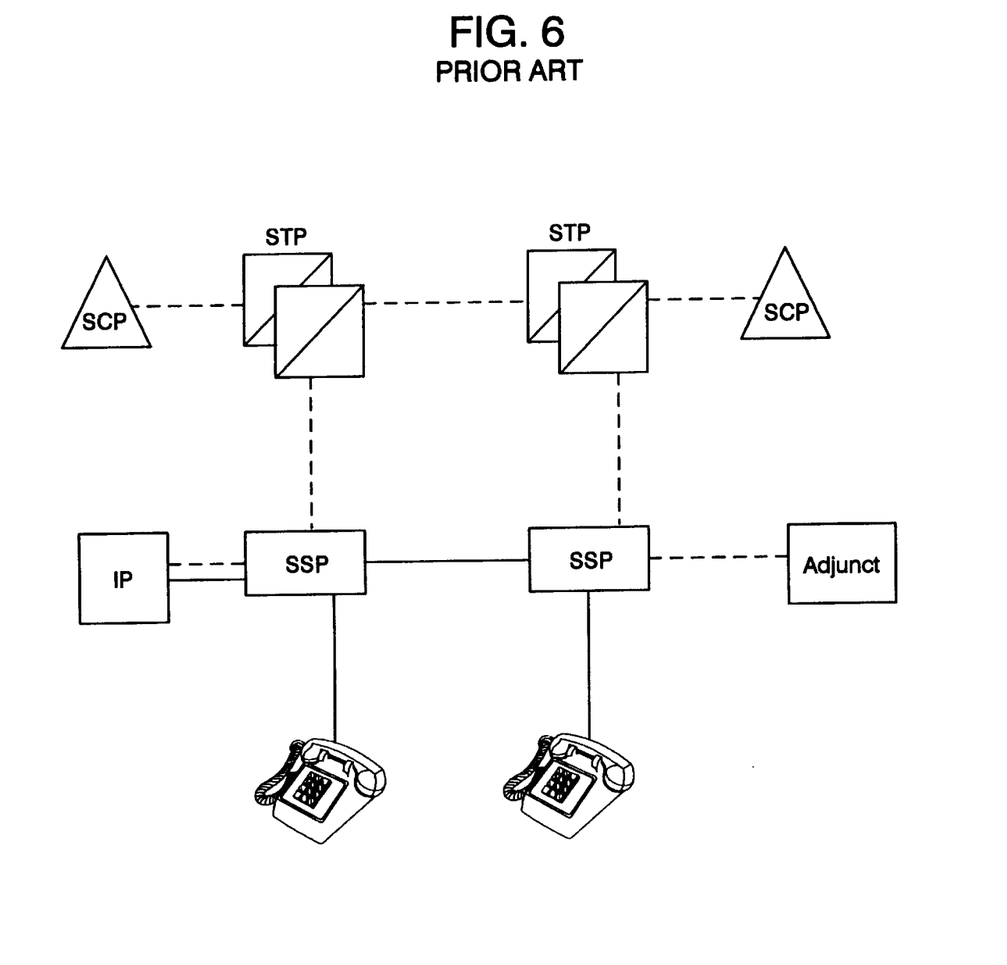
FIG. 6 illustrates the AIN architecture which can be used with the present invention.

FIG. 6 shows the advanced intelligent network (AIN) architecture with which this invention can be employed. An SSP (service switching point) is a switch which can process AIN triggers. Such a switch is typically connected to one or more intelligent peripherals (IP) in addition to other types of user terminals and CPE. In FIG. 6, the solid lines denote the transport network and the dotted lines denote the signaling network. When an SSP makes a query upon identifying an AIN trigger, it can query a service control point (SCP) which is a database connected to a signal transfer point (STP), or it can query an adjunct, which is a local database.

A trigger is a process that identifies calls that need AIN processing. When encountering a trigger, an SSP suspends normal call processing and sends a query. Triggers can be subscribed, group-based, or switch-based. In AIN 0.1 and 0.2, there are triggers that are defined at associated trigger detection points (TDP's). AIN 0.1 and AIN 0.2 are described in the published Bellcore standard GR-1298 which is incorporated herein by reference. The signal transfer point (STP) is a high-speed switch for signaling messages in the AIN network. The SCP is a reliable database that runs service logic programs to provide customer services via the STP's in the network to SSP's. An adjunct is very similar to a SCP but is connected to the SSP by a dedicated link, such as an Ethernet LAN.

Figure 7:
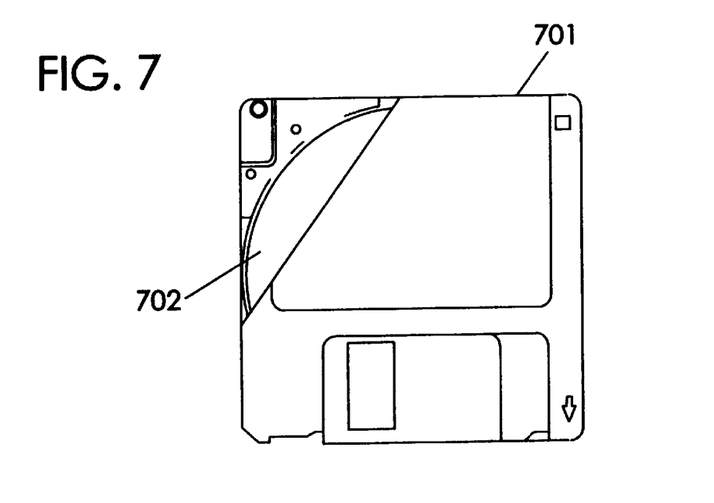
FIG. 7 shows an example program code storage media which may be used with the present invention.

As previously stated, appropriate computer program code in combination with hardware implements some elements of the present invention. This computer program code is at some point stored in a storage media. This media can be a diskette, hard disk or CD-ROM. The media can also be a memory storage device or collection of memory storage devices such as read-only memory (ROM) or random-access memory (RAM). The media can be a hard disk in a server or client computer system, in which case a user or customer can obtain a copy of the code by downloading or network transfer. FIG. 7 illustrates one example of a media. FIG. 7 shows a diskette of the type where a magnetic media 702 is enclosed in a protective jacket 701. Magnetic field changes in over the surface of the magnetic media 702 are used to encode the computer program code. In this way the computer program code is stored for later retrieval.

We have described specific embodiments of our invention for identifying and handling on-line access calls. The specific embodiments use an ISDN public network switch. One of ordinary skill in the networking art will quickly recognize that the invention has other applications in other environments. In fact, many embodiments and implementations are possible.

We claim:

1. In a switch, a method of identifying on-line access calls, the method comprising the steps of:
    collecting and analyzing information received during a call;
    determining if the called party number is a service provider number;
    if the called party number is a service provider number, determining if a port number for the service provider will be exceeded;
    if the port number will not be exceeded, determining if a local area network (LAN) maximum capacity will be exceeded;
    updating numerical tables to account for the call; and
    setting up the call using a dedicated data network which is connected to the switch and the service provider.

2. The method of claim 1 wherein the information collected and analyzed is the called party number (CDN).

3. The method of claim 1 wherein the information collected and analyzed is an access code dialed by a user.

4. The method of claim 1 wherein the information collected and analyzed is information contained in a set-up message.

5. The method of claim 1 wherein the information collected and analyzed is bearer capability information.

6. In a switch, a method of identifying on-line access calls, the method comprising the steps of:
encountering an advanced intelligent network (AIN) trigger when a call is received;
sending a query to a database to determine if the call is to a service provider;
if the call is to a service provider, determining if a port number for the service provider will be exceeded;
if the port number will not be exceeded, determining if a local area network (LAN) maximum capacity will be exceeded;
updating numerical tables to account for the call; and
setting up the call using a dedicated data network which is connected to the switch and the service provider.

7. The method of claim 6 wherein the database is a service control point (SCP).

8. The method of claim 6 wherein the database is an adjunct.

9. A computer program product for use with a switch, the computer program product having a medium with computer program code embodied therein, the computer program code comprising:
computer program code for collecting and analyzing information received during a call;
computer program code for determining if the called party number is a service provider number;
computer program code for if the called party number is a service provider number, determining if a port number for the service provider will be exceeded;
computer program code for if the port number will not be exceeded, determining if a local area network (LAN) maximum capacity will be exceeded;
computer program code for updating numerical tables to account for the call; and
computer program code for setting up the call using a dedicated data network which is connected to the switch and the service provider.

10. The computer program product of claim 9 wherein the information collected and analyzed is the called party number (CDN).

11. The computer program product of claim 9 wherein the information collected and analyzed is an access code dialed by a user.

12. The computer program product of claim 9 wherein the information collected and analyzed is information contained in a set-up message.

13. The computer program product of claim 9 wherein the information collected and analyzed is bearer capability information.

14. A computer program product for use with a switch, the computer program product having a medium with computer program code embodied therein, the computer program code comprising:
computer program code for encountering an advanced intelligent network (AIN) trigger when a call is received;
computer program code for sending a query to a database to determine if the call is to a service provider;
computer program code for if the call is to a service provider, determining if a port number for the service provider will be exceeded;
computer program code for if the port number will not be exceeded, determining if a local area network (LAN) maximum capacity will be exceeded;
computer program code for updating numerical tables to account for the call; and
computer program code for setting up the call using a dedicated data network which is connected to the switch and the service provider.

15. The computer program product of claim 14 wherein the database is a service control point (SCP).

16. The computer program product of claim 14 wherein the database is an adjunct.

17. A switch for connection in a switched network, the switch comprising:
adapters for connection to customer premises equipment (CPE) and a local area network (LAN) which is in turn connected to a dedicated data network;
a switch matrix disposed between the adapters; and
a processing core connected to the switch matrix, the processing core having computer program code for identifying an on-line access call directed to a service provider, determining if a port number for the service provider will be exceeded, determining if a maximum capacity of the LAN will be exceeded, and setting up the on-line access call using the dedicated data network.

18. The switch of claim 17 wherein identifying the on-line access call is accomplished through analysis of information received when the call is initiated.

19. The switch of claim 17 wherein identifying the on-line access call is accomplished through a database query initiated when an advanced intelligent network (AIN) trigger is encountered.

20. The switch of claim 19 wherein the database query is made to a service control point (SCP).

21. The switch of claim 19 wherein the database query is made to an adjunct.

22. A network in which on-line access calls can be identified for redirection from a public network switching fabric to a dedicated data network switching fabric, the network comprising:
customer premises equipment (CPE);
a point of presence (POP) for a service provider connected to a dedicated data network;
a local area network (LAN) connected to the dedicated data network; and
a switch disposed between the CPE and the LAN, the switch having a processing core having computer program code for identifying an on-line access call directed to a service provider, determining if a port number for the service provider will be exceeded, determining if a maximum capacity of the LAN will be exceeded, and setting up the on-line access call using the dedicated data network.

23. The network of claim 22 wherein identifying the on-line access call is accomplished through analysis of digits of a called party number (CDN).

24. The network of claim 22 wherein identifying the on-line access call is accomplished through a database query initiated when an advanced intelligent network (AIN) trigger is encountered.

25. The network of claim 24 wherein the database query is made to a service control point (SCP).

26. The network of claim 24 wherein the database query is made to an adjunct.

* * * * *